(12) United States Patent
Bharat et al.

(10) Patent No.: US 7,096,214 B1
(45) Date of Patent: Aug. 22, 2006

(54) SYSTEM AND METHOD FOR SUPPORTING EDITORIAL OPINION IN THE RANKING OF SEARCH RESULTS

(75) Inventors: Krishna Bharat, Santa Clara, CA (US); Benedict Gomes, Berkeley, CA (US); Georges R. Harik, Mountain View, CA (US); Marissa Mayer, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 19 days.

(21) Appl. No.: 09/734,887

(22) Filed: Dec. 13, 2000

Related U.S. Application Data

(60) Provisional application No. 60/171,020, filed on Dec. 15, 1999.

(51) Int. Cl.
*G06F 17/30* (2006.01)

(52) U.S. Cl. ............................................. 707/3

(58) Field of Classification Search ........... 707/1–10, 707/100–104.1, 200–205; 705/10, 14; 709/219
See application file for complete search history.

(56) References Cited

U.S. PATENT DOCUMENTS

| | | | | |
|---|---|---|---|---|
| 5,724,567 A | * | 3/1998 | Rose et al. ................. | 707/3 |
| 5,918,014 A | * | 6/1999 | Robinson ................... | 709/219 |
| 6,112,202 A | * | 8/2000 | Kleinberg .................. | 707/5 |
| 6,356,899 B1 | * | 3/2002 | Chakrabarti et al. ....... | 707/5 |
| 6,363,378 B1 | * | 3/2002 | Conklin et al. ............ | 707/5 |
| 6,453,315 B1 | * | 9/2002 | Weissman et al. .......... | 707/5 |
| 2005/0289140 A1 | | 12/2005 | Ford et al. ................. | 707/5 |

OTHER PUBLICATIONS

Lewis, D., "Evaluating and Optimizing Autonomous Text Classification Systems," SIGIR 95: Proceedings of the Eighteenth Annual International ACM-SIGIR Conference on Research and Development in Information Retrieval, Jul. 1995, pp. 246-254.

Brin, S. and L. Page, "The Anatomy of a Large-Scale Hypertextual Web Search Engine," 7th International World Wide Web Conference, Brisbane, Australia, Elsevier Science, Apr. 1998, pp. 107-117.

Kleinberg, J., "Authoritative Sources in a Hyperlinked Environment," Proc. 9th ACM-SIAM Symposium on Discrete Algorithms, 1998, pp. 1-33.

Koller, D. and M. Sahami, "Hierarchically Classifying Documents Using Very Few Words," International Conference on Machine Learning, 1997, pp. 170-178.

* cited by examiner

*Primary Examiner*—Diane Mizrahi
(74) *Attorney, Agent, or Firm*—Harrity Snyder, LLP

(57) ABSTRACT

A server improves the ranking of search results. The server includes a processor and a memory that stores instructions and a group of query themes. The processor receives a search query containing at least one search term, retrieves one or more objects based on the at least one search term and determines whether the search query corresponds to at least one of the group of query themes. The processor then ranks the one or more objects based on whether the search query corresponds to at least one of the group of query themes and provides the ranked one or more objects to a user.

37 Claims, 6 Drawing Sheets

SYSTEM AND METHOD FOR SUPPORTING EDITORIAL OPINION IN THE RANKING OF SEARCH RESULTS

RELATED APPLICATION

This application claims priority under 35 U.S.C. § 119(e) based on U.S. Provisional Application Ser. No. 60/171,020, filed Dec. 15, 1999, the disclosure of which is incorporated herein by reference.

BACKGROUND OF THE INVENTION

A. Field of the Invention

The present invention relates generally to information retrieval systems and, more particularly, to a system and method for supporting editorial opinion in the ranking of search results.

B. Description of Related Art

The Internet has become an increasingly important part of our everyday lives. Millions of people now access the Internet on a daily basis to shop for goods and services, obtain information of interest (e.g., movie listings), and to communicate with friends, family, and co-workers (e.g., via e-mail).

Currently, when a person wishes to purchase a product or simply find information on the Internet, the person enters into his/her web browser a Uniform Resource Locator (URL) pertaining to a web site of interest in order to access that particular web site. The person then determines whether the information of interest is available at that particular web site.

For example, suppose a consumer wishes to purchase a printer via the Internet. The consumer accesses the Internet and types in a vendor's URL. The consumer is then able to access that vendor's home page to determine whether the vendor has the product that the consumer wishes to purchase.

If the consumer is not aware which vendors sell printers, the consumer may access a conventional search engine. The consumer enters the generic term "printer" into the search engine to attempt to locate a vendor that sells printers. Using a commercial search engine in this manner to locate individual web sites that offer the desired product or service often results in hundreds or even thousands of "hits" (i.e., web pages that relate to the search term).

The consumer must then decide which particular web pages to visit. Viewing each web page to determine whether the particular web site offers the desired product is a time consuming process. As a result, a current trend in the area of search services involves providing a ranked list of web pages in response to the search query. To generate such a list, the services may match terms in the query against the partial or full text of documents in its database or use historical information regarding which web pages were viewed in response to certain queries, etc.

Other search services have attempted to improve Internet searching by compiling static lists of web pages on specific topics. Directory listings, such as Yahoo! (www.yahoo.com) and Open Directory (www.dmoz.org), are examples. These services map a search query against the editorial comments accompanying each web page that was reviewed by an editor of the service, and optionally the full text of the documents, to generate a list of results. The scope of these services is limited, however, to the set of pages that has been reviewed by the search services' editors.

AskJeeves (www.ask.com) generalizes the application of editorial opinion to a collection of pages. Their editors identify a set of pages that share a common theme (e.g., home pages of airports) and associate this set of pages with specific trigger words (e.g., the word "airport"). When one of the trigger words appears in the query, they present the user with a concise representation of the associated set of pages, allowing the user to choose one. Again, the scope of this technique is restricted to the set of pages that were reviewed by the editors, which tends to be many orders of magnitude smaller than the set of useful pages on the World Wide Web.

Therefore, there exists a need for a system and method that improve Internet searching.

SUMMARY OF THE INVENTION

A system and method, consistent with the present invention, address this and other needs by providing a mechanism that enhances the ranking of search results by integrating editorial opinion.

In accordance with the purpose of the invention as embodied and broadly described herein, a method that provides search results is disclosed. The method includes receiving a search query, retrieving one or more objects in response to the search query, determining whether the search query corresponds to at least one query theme of a group of query themes, ranking the one or more objects based on a result of the determination, and providing the ranked one or more objects.

In another implementation consistent with the present invention, a method for determining an editorial opinion parameter for use in ranking search results is disclosed. The method includes developing one or more query themes, identifying, for each query theme, a first set of objects as being favored, identifying, for each query theme, a second set of objects as being non-favored, and determining an editorial opinion parameter for each of the objects in the first and second sets.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

A system and method, consistent with the present invention, enhance search services by integrating editorial opinion in the ranking of search results.

Exemplary Network

Figure 1:
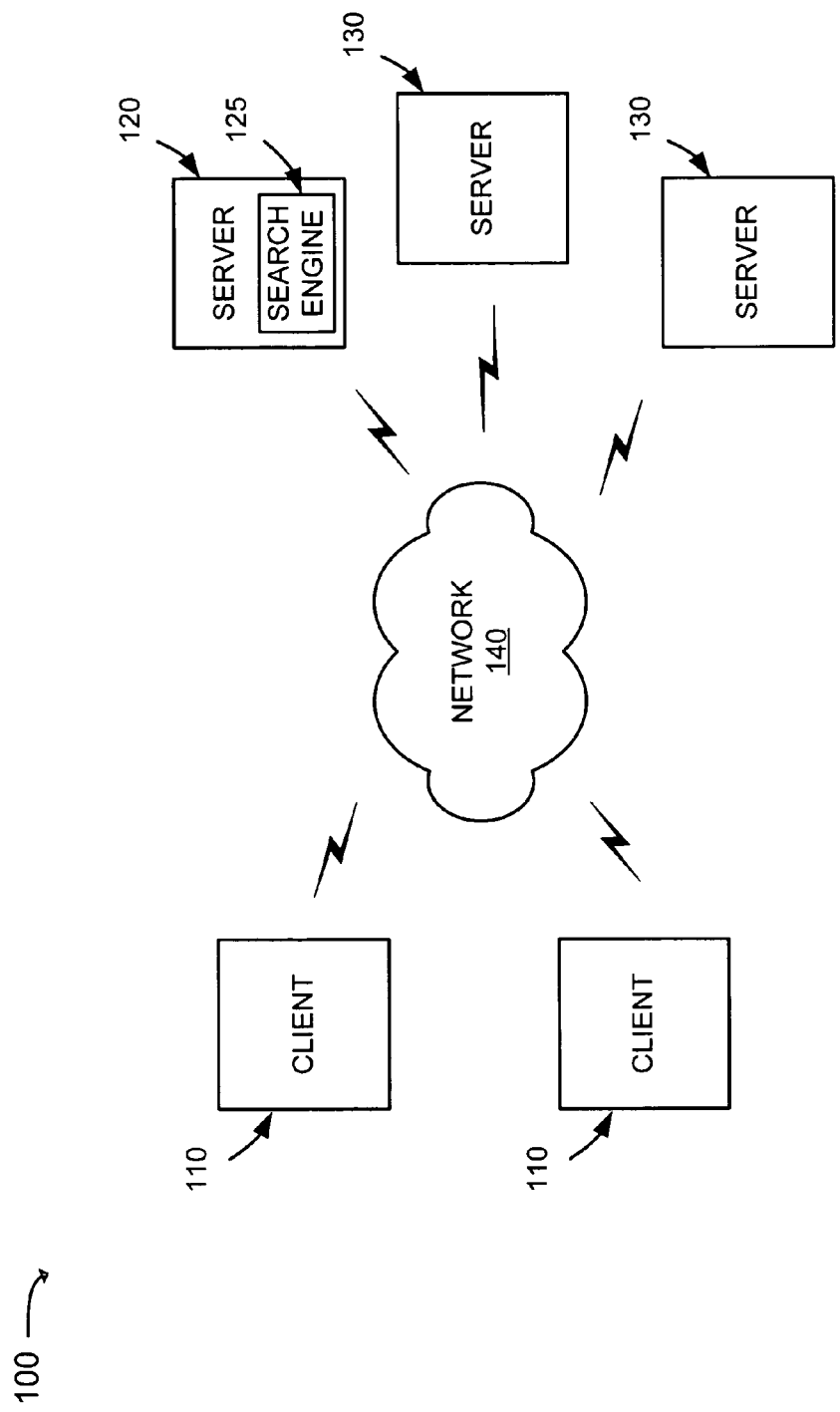
FIG. 1 illustrates an exemplary network in which a system and method, consistent with the present invention, may be implemented.

FIG. 1 illustrates an exemplary network 100 in which a system and method, consistent with the present invention, may be implemented. The network 100 may include multiple client devices 110 connected to multiple servers 120–130 via a network 140. The network 140 may include a local area network (LAN), a wide area network (WAN), a telephone network, such as the Public Switched Telephone Network (PSTN), an intranet, the Internet, or a combination of networks. Two client devices 110 and three servers 120–130 have been illustrated as connected to network 140 for simplicity. In practice, there may be more or less client devices and servers. Also, in some instances, a client device may perform the functions of a server and a server may perform the functions of a client device.

The client devices 110 may include devices, such mainframes, minicomputers, personal computers, laptops, personal digital assistants, or the like, capable of connecting to the network 140. The client devices 110 may transmit data over the network 140 or receive data from the network 140 via a wired, wireless, or optical connection.

The servers 120–130 may include one or more types of computer systems, such as a mainframe, minicomputer, or personal computer, capable of connecting to the network 140 to enable servers 120–130 to communicate with the client devices 110. In alternative implementations, the servers 120–130 may include mechanisms for directly connecting to one or more client devices 110. The servers 120–130 may transmit data over network 140 or receive data from the network 140 via a wired, wireless, or optical connection.

In an implementation consistent with the present invention, the server 120 may include a search engine 125 usable by the client devices 110. The servers 130 may store documents (or web pages) accessible by the client devices 110.

Exemplary Client Architecture

Figure 2:
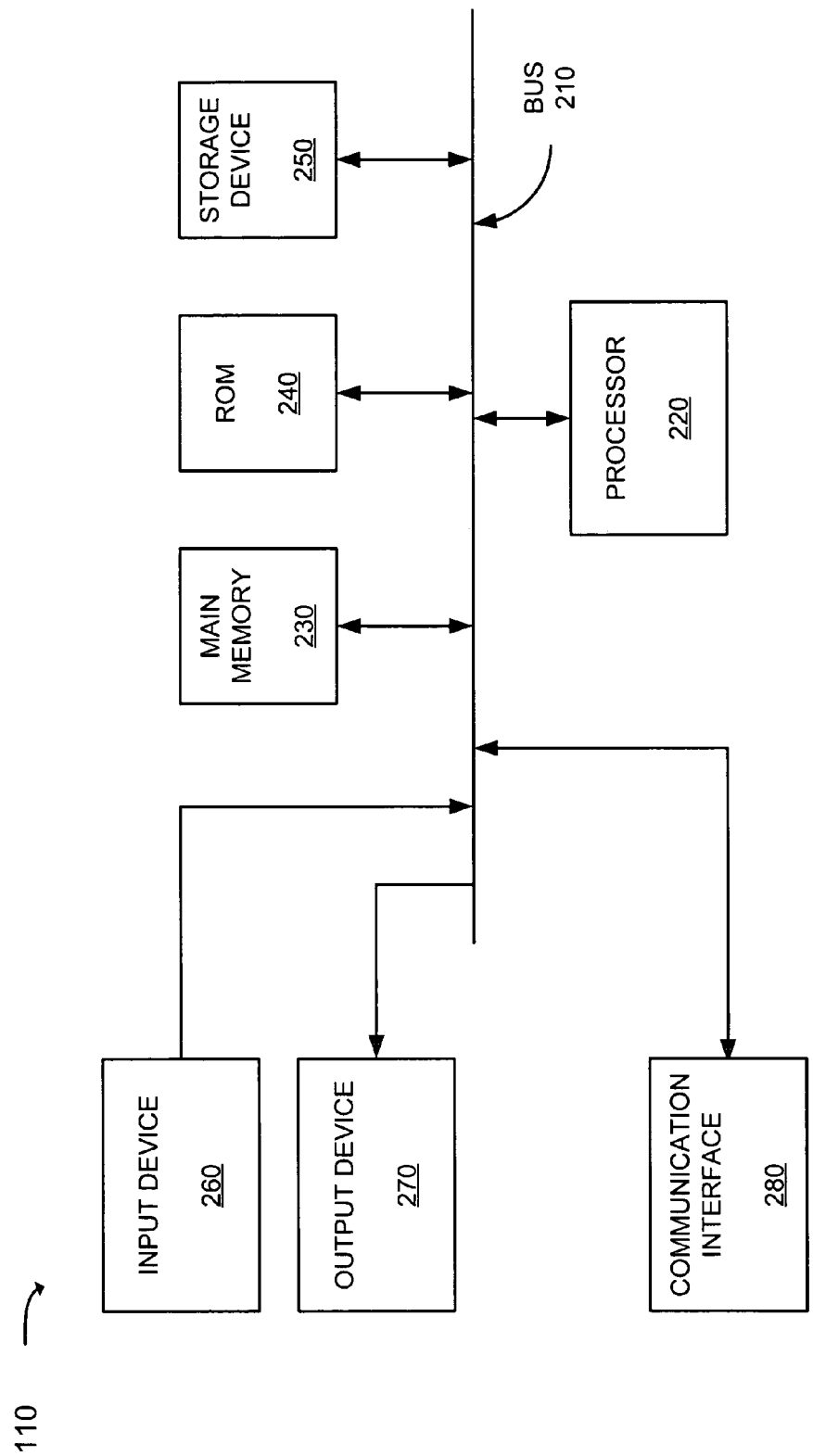
FIG. 2 illustrates an exemplary client device consistent with the present invention.

FIG. 2 illustrates an exemplary client device 110 consistent with the present invention. The client device 110 may include a bus 210, a processor 220, a main memory 230, a read only memory (ROM) 240, a storage device 250, an input device 260, an output device 270, and a communication interface 280. The bus 210 may include one or more conventional buses that permit communication among the components of the client device 110.

The processor 220 may include any type of conventional processor or microprocessor that interprets and executes instructions. The main memory 230 may include a random access memory (RAM) or another type of dynamic storage device that stores information and instructions for execution by the processor 220. The ROM 240 may include a conventional ROM device or another type of static storage device that stores static information and instructions for use by the processor 220. The storage device 250 may include a magnetic and/or optical recording medium and its corresponding drive.

The input device 260 may include one or more conventional mechanisms that permit a user to input information to the client device 110, such as a keyboard, a mouse, a pen, voice recognition and/or biometric mechanisms, etc. The output device 270 may include one or more conventional mechanisms that output information to the user, including a display, a printer, a speaker, etc. The communication interface 280 may include any transceiver-like mechanism that enables the client device 110 to communicate with other devices and/or systems. For example, the communication interface 280 may include mechanisms for communicating with another device or system via a network, such as network 140.

As will be described in detail below, the client devices 110, consistent with the present invention, perform certain searching-related operations. The client devices 110 may perform these operations in response to processor 220 executing software instructions contained in a computer-readable medium, such as memory 230. A computer-readable medium may be defined as one or more memory devices.

The software instructions may be read into memory 230 from another computer-readable medium, such as the data storage device 250, or from another device via the communication interface 280. The software instructions contained in memory 230 causes processor 220 to perform search-related activities described below. Alternatively, hardwired circuitry may be used in place of or in combination with software instructions to implement processes consistent with the present invention. Thus, the present invention is not limited to any specific combination of hardware circuitry and software.

Exemplary Server

Figure 3:
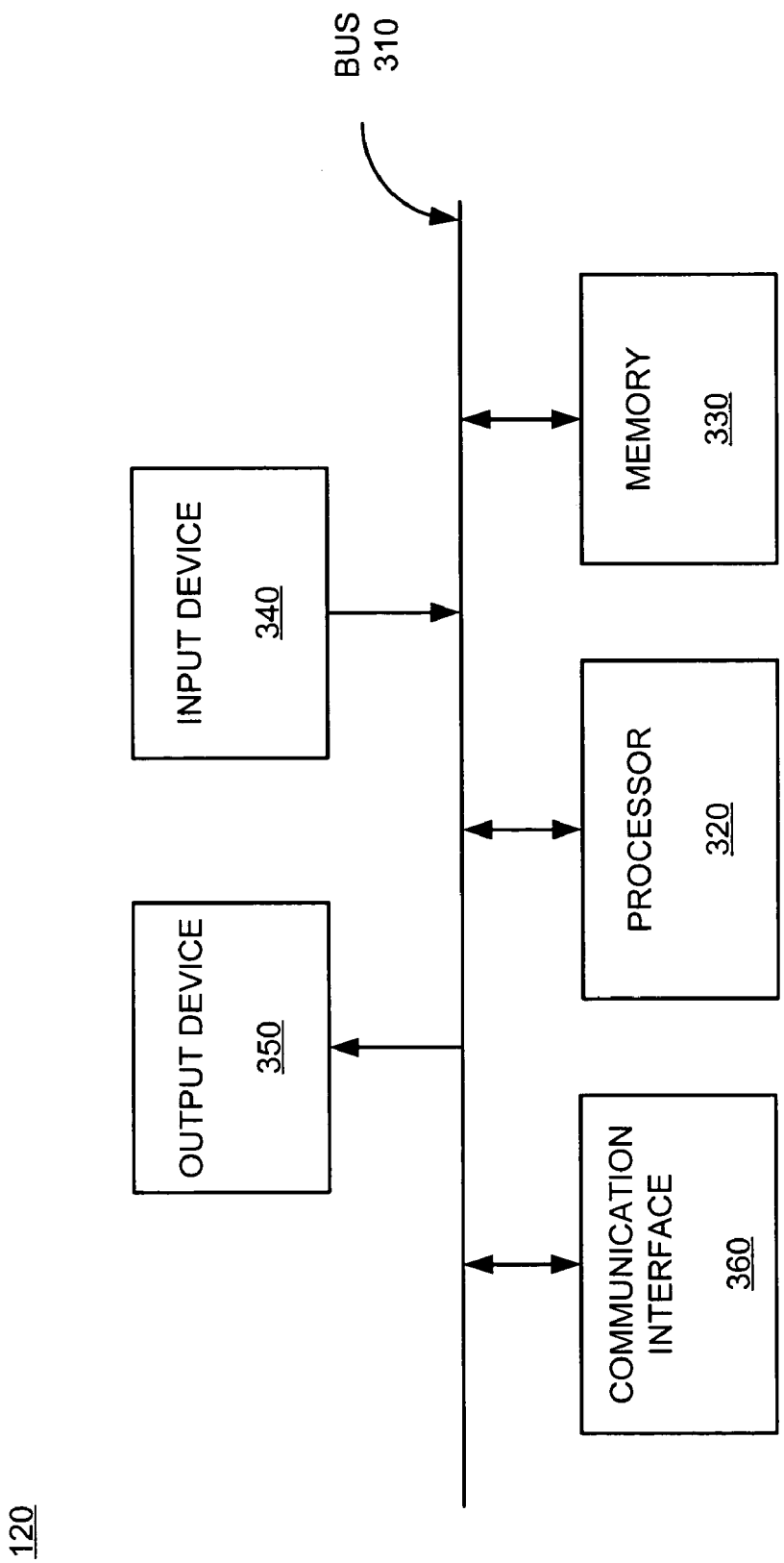
FIG. 3 illustrates an exemplary server consistent with the present invention.

FIG. 3 illustrates an exemplary server 120 consistent with the present invention. Server 130 may be similarly configured. The server 120 includes a bus 310, a processor 320, a memory 330, an input device 340, an output device 350, and a communication interface 360. The bus 310 may include one or more conventional buses that allow communication among the components of the server 120.

The processor 320 may include any type of conventional processor or microprocessor that interprets and executes instructions. The memory 330 may include a RAM or another type of dynamic storage device that stores information and instructions for execution by the processor 320; a ROM or another type of static storage device that stores static information and instructions for use by the processor 320; and/or some other type of magnetic or optical recording medium and its corresponding drive.

The input device 340 may include one or more conventional devices that permits an operator to input information to the server 120, such as a keyboard, a mouse, a pen, voice recognition and/or biometric mechanisms, and the like. The output device 350 may include one or more conventional devices that outputs information to the operator, including a display, a printer, a speaker, etc. The communication interface 360 may include any transceiver-like mechanism that enables the server 120 to communicate with other devices and/or systems. For example, the communication interface 360 may include mechanisms for communicating with other servers 130 or the client devices 110 via a network, such as network 140.

Execution of the sequences of instructions contained in memory 330 causes processor 320 to perform the functions described below. In alternative embodiments, hardwired circuitry may be used in place of or in combination with software instructions to implement the present invention. Thus, the present invention is not limited to any specific combination of hardware circuitry and software.

A server 120, consistent with the present invention, may provide information from one or more associated databases to a graphical user interface at the client devices 110. The databases may be stored at the server 120 (e.g., in memory 330) or externally from server 120.

Figure 4:
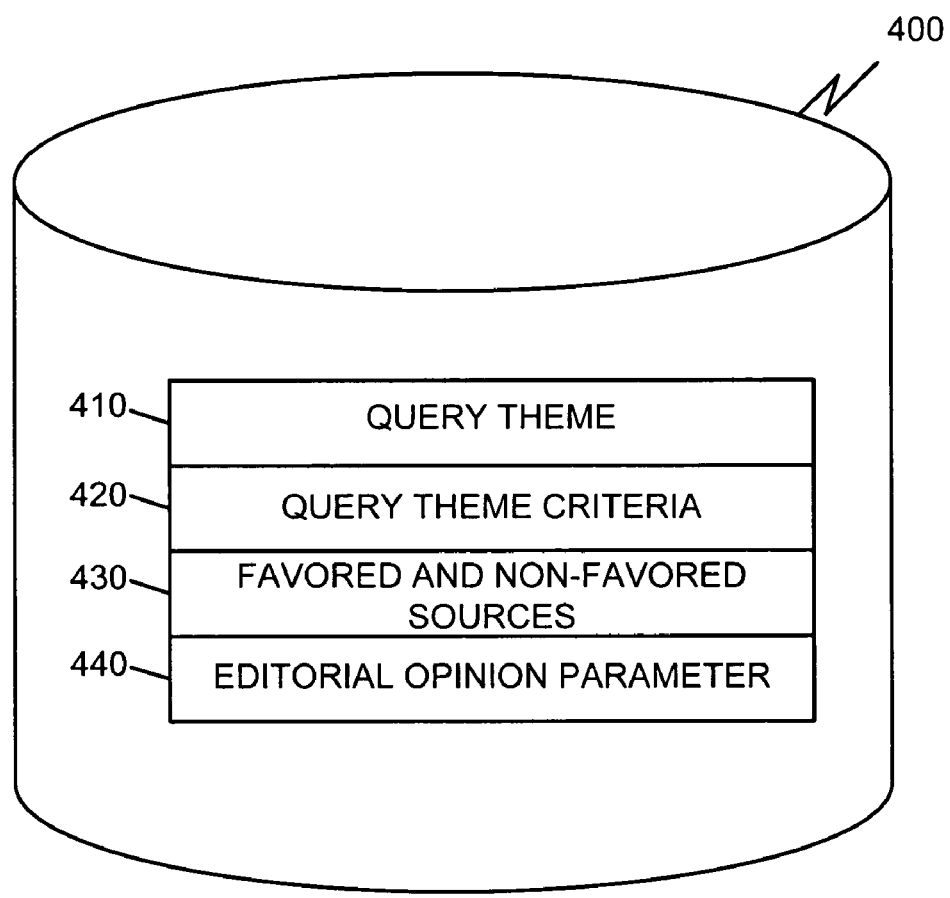
FIG. 4 illustrates an exemplary database, consistent with the present invention, that may be associated with the server of FIG. 3.

FIG. 4 illustrates an exemplary database 400, consistent with the present invention, that may be associated with server 120. While only one database is described below, it will be appreciated that the server 120 may be associated with one or more additional databases (not shown) stored locally at server 120 or distributed throughout the network 140.

As illustrated, the database 400 may include a query theme field 410, a query theme criteria field 420, a favored and non-favored sources field 430, and an editorial opinion parameter field 440. The database 400 may include additional fields (not shown) that aid in searching and sorting information in database 400 and/or information retrieved from the network 140.

The query theme field 410 may store information that identifies query themes. Query themes refer to topics found to be commonly occurring in search queries deployed by users in the network 140. Editors may, in an implementation consistent with the present invention, develop these query themes based on an examination of search query logs and determining categories of information for which people are entering queries. Exemplary query themes may be "sites that provide free software downloads" or "sites that help people find an accommodation."

The query theme criteria field 420 may store criteria for determining whether a search query satisfies a particular query theme identified in the query theme field 410. These criteria can be established in at least two different ways. In a first way, the editors may construct a rule for each query theme to decide if a future search query belongs to the theme. For the query theme "sites that provide free software downloads," the rule may be the requirement that the query contain the word "free" and "download." For the query theme "sites that help in finding an accommodation," the rule may be the requirement that the query contain one of the words: {"accommodation," "lodging," "hotels," . . . } and also that the query contains the name of a place (e.g., by matching one of a list of place names).

In an implementation consistent with the present invention, the rule may be represented as a boolean expression. For example, a rule for sites that provide free software downloads may be ("free" AND "download"). A rule for sites that help in finding an accommodation may be (("accommodation" OR "lodging" OR "hotels" OR "motels")

AND ("Alabama" OR "Alaska" OR . . . "Wyoming")).

In a second way, the editors may establish categories/topics from a directory that may be compared to the search query to determine if the query satisfies a particular query theme. For example, a set of topics could be the topics in an online hierarchical directory (e.g., a Web Directory), such as Open Directory, Yahoo!, or Google (www.google.com). For determining sites that help in finding accommodations, a query theme could be expressed as a set of topics in Yahoo! as shown below:

Recreation: Travel: Lodging;
Regional: UK: Travel and Tourism: Accommodation;
Regional: NZ: Business: Accommodation;
Recreation: Travel: Backpacking: Budget Accommodation;
Regional: NZ: Nelson: Accommodation;
Regional: Australia: Queensland: Tourism: Accommodation;
Regional: Europe: Italy: Tourism: Hotels;
Regional: UK: England: London: Accommodation: Hotels;
etc.

It will be appreciated that a long list of such topics can be expressed in more concise forms as well.

To determine the directory topics that best represent a query theme, the editors may first identify a set of queries that are representative of the query theme. For example, an editor may select the queries:

accommodation in New York;
Florida hotels; and
Best Western Inns in Nebraska as three examples of the query theme "sites that help in finding accommodation." These sample queries may then be classified into a topic hierarchy like Yahoo! by, for example, executing the sample queries and taking the best matching topics to represent the query theme. To classify multiple queries into a set of topics, the results from all the queries may be combined, and the combined set of results may be compared with pages associated with each of the topics. The topics with the highest number of matching pages in the combined result set may be selected.

To enhance performance, multiple online topic hierarchies can be used for classification. Moreover, the various techniques used for classifying queries into topics can be combined to increase the level of confidence.

The favored and non-favored sources field 430 may include information that identifies sets of web pages/sites that are either "favored sources" (i.e., identified sources of useful or authoritative content on the desired subject) or "non-favored sources" (i.e., identified as sources of misinformation or over-promotion on that subject) for a particular query theme. For example, for the query theme "sites that provide free downloads," web sites that actually provide free software downloads would be considered "favored sources" and web sites that mislead search engines with words such as "free" and "download" (popularly known as "spam techniques"), but do not in fact provide access to free downloads, would be considered "non-favored sources."

Classifying web sites as "favored" may be based on host names. For example, the web site of the World Wildlife Fund is hosted by www.wwf.org. This web site would be a favored source for queries dealing with wildlife or animals. A host may contain more than one web site. Since parts of a web site may be relevant while other parts are not, the relevant parts can be denoted by a set of URL prefixes (e.g., www.geocities.com/A/B/C).

In an implementation consistent with the present invention, the set of favored and non-favored sources may be automatically determined. To accomplish this, exemplary queries in the query theme may be classified into a set of topics (e.g., an online topic hierarchy, such as Yahoo!, Open Directory, or Google) using the approach for classification described above. Web hosts that appear in the URLs associated with the best matching topics to the query theme may be taken to be favored sources. For example, if the query theme is "sites that help in finding accommodation," then web hosts listed under the Open Directory category "http://dmoz.org/Recreation/Travel/Lodging" can be taken as favored sources.

The editorial opinion parameter field 440 may include parameters that quantify the editorial opinion for specific favored and non-favored sources for search queries that match specific query themes. As will be described in more detail below, the editorial opinion parameter may be used to modify the placement of applicable web pages in the ranking of search results.

Exemplary Processing

Figure 5:
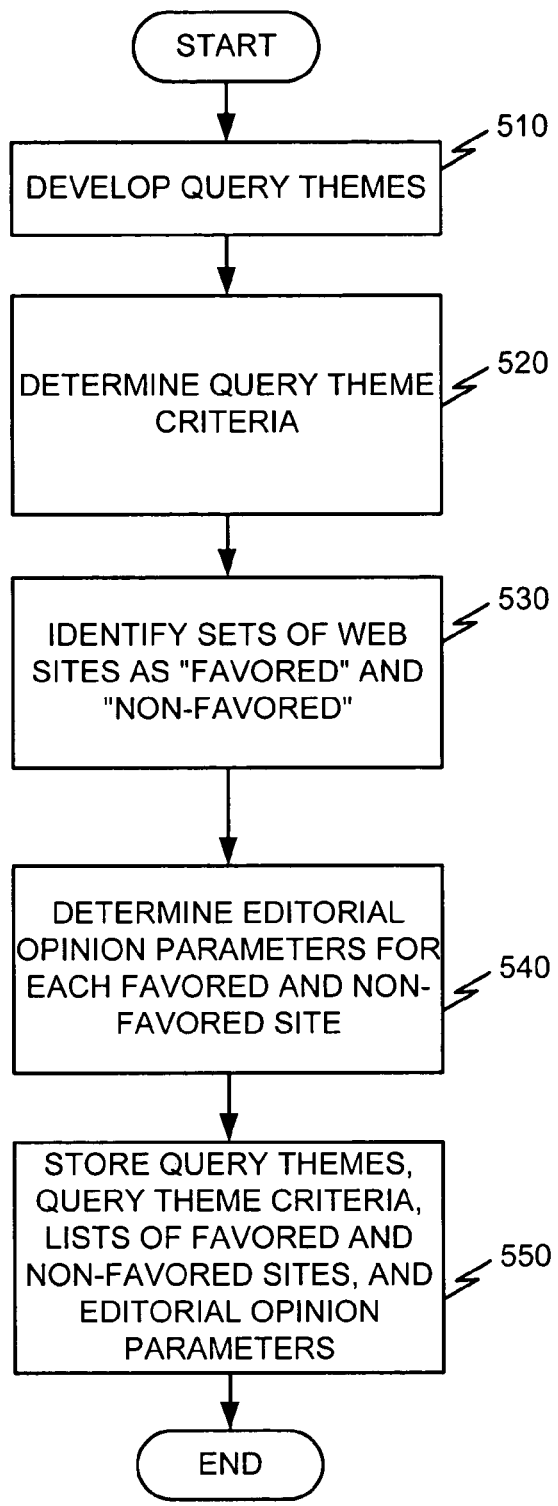
FIG. 5 illustrates an exemplary process, consistent with the present invention, for determining editorial opinion parameters.

FIG. 5 illustrates an exemplary process, consistent with the present invention, for determining editorial opinion parameters. Processing may begin with an editor or group of editors developing, via, for example, client device 110, a set of query themes [act 510]. The editors may develop these query themes by, for example, surveying user search query logs, experimenting with test search queries, and examining search result lists. As described above, an exemplary query theme may be "sites that provide free software downloads."

For each query theme, the editors may determine query theme criteria for identifying whether a particular search query satisfies a query theme [act 520]. As described above, the query theme criteria may be in the form of one or more rules and/or sets of categories or topics from a directory. For the query theme identified above, an exemplary rule may be that the search query must contain the words "free" and "download" and an exemplary directory topic may be "Computer: Software: Shareware."

Once query themes and associated criteria have been developed, the editors may identify, for each query theme, sets of web sites as being from "favored sources" and "non-favored sources" [act 530]. As described above, "favored sources" refer to those web pages/sites identified as containing useful and authoritative content on the subject desired and "non-favored sources" refer to those web pages/sites identified as sources of misinformation or over-promotion on that subject. This identification of favored sources and non-favored sources may be performed manually by the editors (e.g., by performing test queries and identifying those web sites that are misleading) or automatically by the client device 110 or server 120 or 130 (e.g., by identifying web hosts that exist under conventional hierarchical online directories as "favored sources" or "non-favored sources").

For each web page/site identified as favored and non-favored, the editors may determine an editorial opinion parameter for that site [act 540]. As will be described in more detail below, a server, such as server 120, may use the editorial opinion parameter to adjust the score of a particular web page up or down depending upon whether the web site is "favored" or "non-favored." The editors may store the query themes, query theme criteria, sets of favored and non-favored web pages/sites for each query theme, and an editorial opinion parameter for each favored and non-favored web page/site in memory, such as memory 330, of server 120 [act 550].

Figure 6:
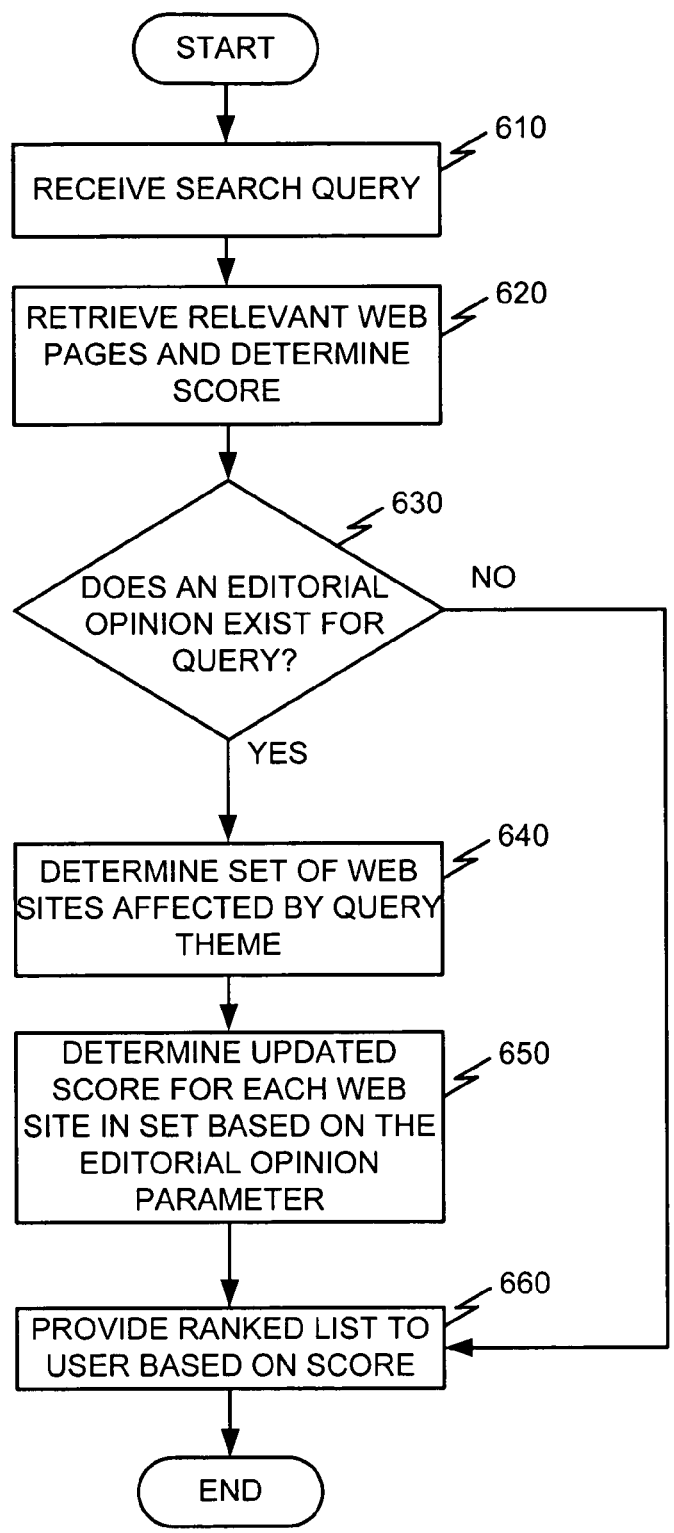
FIG. 6 illustrates an exemplary process, consistent with the present invention, for integrating editorial opinion in the ranking of search results.

FIG. 6 illustrates an exemplary process, consistent with the present invention, for integrating editorial opinion in the ranking of search results. Processing may begin with a server, such as server 120, receiving a search query, containing one or more search terms, from a user [act 610]. The user may transmit the search query to the server 120 from, for example, client device 110 in a well-known manner. Based on the query, the server 120 may retrieve relevant web pages and score those pages using conventional techniques [act 620]. The server 120 may, for example, determine a score for the web pages based on the number of occurrences of the search term(s) in the web pages. Those web pages in which the search term(s) appear more frequently may be scored higher than those web pages in which the search term(s) appear less frequently. Other conventional techniques may also be used to determine the overall scores, such as connectivity and/or popular opinion.

The server 120 may determine if an editorial opinion exists for the search query [act 630]. To make such a determination, the server 120 may determine whether the search query satisfies a query theme in database 400. To check if a search query matches a query theme, the server 120 may determine whether the query satisfies the query theme criteria associated with the query theme. In making such a determination, the server 120 may determine whether the search query contains one or more key terms associated with a rule. For example, if the search query contains the words "free" and "download," the server 120 may determine that the search query belongs to the query theme "sites that provide free software downloads."

The server 120 may also determine whether the search query relates to the categories/topics associated with a particular query theme. To do so, the server 120 may classify the query into the same set of categories/topics in which the query themes were classified using, for example, conventional text-based classification techniques. If the server 120 classifies the query into a topic associated with a query theme, the search query may be assumed to belong to that query theme.

In another implementation consistent with the present invention, to classify a query into a set of topics, the server 120 may compare the pages in the result set for the query with pages previously associated with each of the topics. Hierarchical directories, such as Yahoo!, Open Directory, or Google, typically maintain a list of pages associated with each topic in the directory. These pages can be used to classify the search query. The server 120 may compare the pages matching the query and pages in the topic by determining either (i) a textual content match, or (ii) proximity on the World Wide Web between the pages in the result set and the pages associated with the topic. The query may be classified into the topics with the highest number of matching pages in the result set.

If the server 120 determines that the search query satisfies a query theme and, therefore, that an editorial opinion exists for the search query, the server 120 may then determine a set of web sites affected by the query theme [act 640]. The server 120 may determine the set of affected web sites by determining whether the retrieved web pages are associated with any of the favored or non-favored sources associated with the query theme. For each web page in the result set that is associated with one of the web sites in the set of affected web sites, the server 120 may determine an updated score using an editorial opinion parameter for that web site [act 650].

An editorial opinion parameter for a favored source may, for example, cause the score of the associated web page to be upgraded by a percentage of its previous score or by an absolute value. Similarly, for non-favored sources, the applicable editorial opinion parameter may cause the score of the associated web page to be downgraded by a percentage of its previous score or an absolute value. In extreme cases, the applicable editorial opinion parameter may cause the web page to be moved to the top of the ranked list or removed from the list completely. In another case, the applicable editorial opinion parameter of a web site may selectively affect one of the scores used in determining the final ranking (e.g., the text match score, the connectivity-based score, or the popular opinion score).

Once updated scores have been determined, the server 120 may provide the updated ranked list of search results to the user [act 660]. The updated ranked list may be provided to the user via the output device 270. If, in act 630, the search query does not match any of the query themes stored in database 400, the server 120 may provide the original (i.e., non-updated) ranked list of search results to the user [act 660].

Implementations consistent with the present invention allow editorial opinion to apply to entire web sites. The techniques described herein also provide integration with other parameters in computing an overall ranking. For example, editorial opinion may be considered as an additional input parameter that combines with other factors such as textual-matching, connectivity analysis scoring, etc., for determining the overall ranking. This provides for a better result than conventional processes that simply return web pages on favored sites that match the query. In particular, implementations consistent with the present invention could assign a higher rank to a web page that is on a web site that has not been identified as a favored source in comparison to a web page from a favored source, if it is found to better match the query.

Implementations consistent with the present invention also allow for negative opinion. When a web page is from a non-favored source, the server 120 may reduce an associated score or even remove the web page from the resulting ranked list.

CONCLUSION

A system and method, consistent with the present invention, enhance the ranking of web search results. By integrating editorial opinion into the ranking process, the present invention ensures that more robust results are provided.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the above description focused on Internet searching, the present invention is not so limited. In fact, the present invention is equally applicable to any searching environment in which the consideration of editorial opinion would be beneficial. Moreover, while series of acts have been presented with respect to FIGS. 5 and 6, the order of the acts may be altered in other implementations consistent with the present invention. No element, act, or instruction used in the description of the present application should be construed as critical or essential to the invention unless explicitly described as such.

The scope of the invention is defined by the following claims and their equivalents.

What is claimed is:

1. A method, implemented by a computer device, for providing search results, comprising:
   receiving a search query;
   retrieving one or more objects in response to the search query;
   automatically determining whether the search query corresponds to at least one query theme of a group of query themes;
   determining whether any of the one or more objects relates to a list of favored or non-favored sources;
   ranking the one or more objects based on a result of the determination of whether the search query corresponds to at least one query theme and the determination whether any of the one or more objects relates to the list of favored or non-favored sources; and
   providing the ranked one or more objects to a client.

2. The method of claim 1 wherein the objects include web pages.

3. The method of claim 1 wherein the ranking includes:
   determining a score for those objects that are unrelated to the list of favored or non-favored sources using a first group of parameters,
   determining a score for those objects that relate to the list of favored or non-favored sources using the first group of parameters and an editorial opinion parameter, and
   ranking the objects based on the determined scores.

4. The method of claim 3 wherein the editorial opinion parameter causes the rank of those objects corresponding to favored sources to be increased and a rank of those objects corresponding to non-favored sources to be decreased.

5. The method of claim 1 wherein the automatically determining includes:
   determining whether the search query corresponds to a query rule associated with each query theme.

6. The method of claim 1 wherein each query theme is classified into a first set of topics, and
   wherein the automatically determining includes:
   classifying the search query into a second set of topics, and
   determining that the search query corresponds to a query theme when the second set of topics relates to the first set of topics associated with that query theme.

7. A computer device that provides search results, comprising:
   means for receiving a search query that includes at least one search term;
   means for retrieving one or more objects based on the at least one search term;
   means for automatically determining whether the search query corresponds to at least one of a plurality of query themes;
   means for determining whether any of the one or more objects relates to a list of favored or non-favored sources;
   means for ranking the one or more objects based on whether the search query corresponds to at least one of the plurality of query themes and whether any of the one or more objects relates to the list of favored or non-favored sources; and
   means for providing the ranked one or more objects to a client.

8. A computer-readable medium containing instructions and embodied on a tangible medium for controlling at least one processor to perform a method that provides search results, the method comprising:
   receiving a search query that includes at least one search term;
   obtaining one or more objects based on the at least one search term;
   automatically determining whether the search query corresponds to at least one of a plurality of query themes;
   determining whether any of the one or more objects relates to a list of favored or non-favored sources;

determining a score for each of the one or more objects based on whether the search query corresponds to at least one of the plurality of query themes and whether any of the one or more objects relates to the list of favored or non-favored sources; and providing a ranked list containing the one or more objects to a client based on the determined score.

9. The computer-readable medium of claim 8 wherein the objects include web pages.

10. The computer-readable medium of claim 8 wherein the providing a ranked list includes:
determining a score for those objects that are unrelated to the list of favored or non-favored sources using a first group of parameters,
determining a score for those objects that relate to the list of favored or non-favored sources using the first group of parameters and an editorial opinion parameter, and
ranking the objects based on the determined scores.

11. The computer-readable medium of claim 10 wherein the editorial opinion parameter causes the rank of those objects corresponding to favored sources to be increased and a rank of those objects corresponding to non-favored sources to be decreased.

12. The computer-readable medium of claim 8 wherein the determining whether the search query corresponds to at least one of a plurality of query themes includes:
determining whether the search query corresponds to a query rule associated with each query theme.

13. The computer-readable medium of claim 8 wherein each query theme is classified into a first set of topics, and
wherein the determining whether the search query corresponds to at least one of a plurality of query themes includes:
classifying the search query into a second set of topics, and
determining that the search query corresponds to a query theme when the second set of topics relates to the first set of topics associated with that query theme.

14. A server comprising:
a memory configured to store instructions and a group of query themes; and
a processor configured to execute the instructions to:
obtain a search query that includes at least one search term,
retrieve one or more objects based on the at least one search term,
automatically determine whether the search query corresponds to at least one query theme of the group of query themes,
determine whether any of the one or more objects relates to a list of favored or non-favored sources,
rank the one or more objects based on whether the search query corresponds to at least one query theme of the group of query themes and whether any of the one or more objects relates to the list of favored or non-favored sources, and
provide the ranked one or more objects to a client.

15. The server of claim 14 wherein, when ranking the one or more objects, the processor is configured to:
determine a score for those objects that are unrelated to the list of favored or non-favored sources using a first group of parameters,
determine a score for those objects that relate to the list of favored or non-favored sources using the first group of parameters and an editorial opinion parameter, and
rank the objects based on the determined scores.

16. The server of claim 15 wherein the editorial opinion parameter causes the rank of those objects corresponding to favored sources to be increased and a rank of those objects corresponding to non-favored sources to be decreased.

17. A method comprising:
developing one or more query themes;
identifying, for each query theme, a first set of objects as favored objects;
identifying, for each query theme, a second set of objects as non-favored objects;
determining an editorial opinion parameter for each of the objects in the first and second sets;
automatically using the editorial opinion parameter, via a computer device, to alter a ranking of a list of objects retrieved in response to a query; and
providing, via the computer device the altered ranked list of objects to a client.

18. The method of claim 17 further comprising:
determining, for each query theme, one or more rules for determining whether a search query satisfies the respective query theme.

19. The method of claim 17 further comprising:
determining, for each query theme, one or more topics for determining whether a search query satisfies the respective query theme.

20. The method of claim 19 wherein the one or more topics are selected from at least one hierarchical directory.

21. The method of claim 17 wherein the first and second sets of objects are sets of web sites.

22. The method of claim 21 wherein the identifying a first set of objects includes:
identifying the first set of objects using host names.

23. The method of claim 21 wherein the identifying a first set of objects includes:
identifying the first set of objects using one or more Uniform Resource Locator (URL) prefixes.

24. The method of claim 21 wherein the identifying a first set of objects includes:
classifying each query theme into a set of topics from a hierarchical directory, and
identifying host names listed under the set of topics as being in the first set of objects for that query theme.

25. The method of claim 17 wherein the editorial opinion parameter causes a rank of an object to be increased or decreased based on whether the object is in the first or second set.

26. A computer-readable medium containing one or more instructions and embodied on a tangible medium for controlling at least one processor to perform a method for providing search results, the method comprising:
identifying, for each of a group of search query themes, a first set of objects as favored objects;
identifying, for each of the group of search query themes, a second set of objects as non-favored objects;
determining an editorial opinion parameter for each of the objects in the first and second sets of objects;
automatically using at least one editorial opinion parameter of the determined editorial opinion parameters to alter a ranking of a list of objects retrieved in response to a query; and
providing the altered ranked list of objects to a client.

27. The computer-readable medium of claim 26 further comprising:
determining, for each search query theme in the group of search query themes, one or more rules for determining whether a search query satisfies the respective search query theme.

28. The computer-readable medium of claim 26 further comprising:
    determining, for each search query theme in the group of search query themes, one or more topics for determining whether a search query satisfies the respective search query theme.

29. The computer-readable medium of claim 28 wherein the one or more topics are selected from at least one hierarchical directory.

30. The computer-readable medium of claim 26 wherein the first and second sets of objects are sets of web sites.

31. The computer-readable medium of claim 30 wherein the identifying a first set of objects includes:
    identifying the first set of objects using host names.

32. The computer-readable medium of claim 30 wherein the identifying a first set of objects includes:
    identifying the first set of objects using one or more Uniform Resource Locator (URL) prefixes.

33. The computer-readable medium of claim 30 wherein the identifying a first set of objects includes:
    classifying each search query theme into a set of topics from a hierarchical directory, and
    identifying host names listed under the set of topics as being in the first set of objects for that search query theme.

34. The computer-readable medium of claim 26 wherein the editorial opinion parameter causes a rank of an object to be increased or decreased based on whether the object is in the first or second set.

35. A system comprising:
    a computer-readable tangible medium containing a data structure comprising:
        a query theme field that stores at least one query theme,
        a favored and non-favored sources field that stores information identifying favored and non-favored web sites for each query theme in the query theme field, and
        an editorial parameter field that stores an editorial parameter for each favored and non-favored web site identified in the favored and non-favored sources field; and
    at least one processor configured to use the data structure to rank objects retrieved in response to a query and provide the ranked objects to a client.

36. The system of claim 35 wherein the at least one query theme includes at least one of a query theme rule and a set of topics from one or more hierarchical directories.

37. A server comprising:
    a memory configured to store a plurality of query themes, information identifying, for each of the plurality of query themes, at least one favored or non-favored item associated with the query theme, and an editorial parameter associated with each favored and non-favored item; and
    a processor configured to:
        receive a search query comprising one or more terms,
        retrieve items using the one or more terms,
        determine a score for each of the retrieved items,
        identify one of the plurality of query themes as matching the search query,
        determine, for each of the retrieved items, whether the retrieved item is associated with one of the favored or non-favored items associated with the one query theme,
        adjust, for each of the retrieved items, the score of the retrieved item when the retrieved item is determined to be associated with a favored or non-favored item, and
        provide a ranked list of items to a client based on the adjusting.

* * * * *